United States Patent [19]
Atalla

[11] Patent Number: 5,594,915
[45] Date of Patent: Jan. 14, 1997

[54] MICROCELL COMPUTER SYSTEM AND METHOD USING CELL ACCESS SWITCH AND FUNCTIONALLY PARTITIONED MOVING MEMORY ARCHITECTURE

[76] Inventor: Martin M. Atalla, 18 Monte Vista Ave., Atherton, Calif. 94025

[21] Appl. No.: 341,303

[22] Filed: Nov. 16, 1994

Related U.S. Application Data

[63] Continuation of Ser. No. 928,917, Aug. 12, 1992, abandoned, which is a continuation-in-part of Ser. No. 791,894, Nov. 13, 1991, abandoned.

[51] Int. Cl.[6] ................................................. G06F 15/00
[52] U.S. Cl. ........................ 395/800; 395/618; 395/200.12
[58] Field of Search ................................. 395/800, 500, 395/200, 650, 600, 200.12; 370/94

[56] References Cited

U.S. PATENT DOCUMENTS

| | | | |
|---|---|---|---|
| 3,905,023 | 9/1975 | Perpiglia | 340/172.5 |
| 4,317,197 | 2/1982 | Ulug | 370/94 |
| 4,814,978 | 3/1989 | Dennis | 395/375 |
| 4,905,141 | 2/1990 | Brenza | 395/456 |
| 5,063,522 | 11/1991 | Winters | 395/51 |
| 5,129,077 | 7/1992 | Hillis | 395/500 |
| 5,151,988 | 9/1992 | Yamagishi | 395/600 |
| 5,191,578 | 4/1993 | Lee | 370/63 |
| 5,191,651 | 4/1993 | Halim et al. | 395/200.2 |
| 5,218,602 | 6/1993 | Grant et al. | 370/58.2 |
| 5,224,099 | 6/1993 | Corbalis et al. | 370/94.2 |
| 5,247,697 | 9/1993 | Ban | 395/800 |

Primary Examiner—Alyssa H. Bowler
Assistant Examiner—John Follansbee
Attorney, Agent, or Firm—Fish & Richardson P.C.

[57] ABSTRACT

A computer system architecture includes microcell computing units with a moving memory distribution of data and instructions to the microcells which are connected to users and other peripheral devices via a telephony type of cell access switch. The computing microcell can be a single computing element or can be a nucleus processor which is connected to a number of satellite processors via a bus or star configuration, and which interfaces with the moving memory modules and cell access switch. The moving memory modules are functionally petitioned to include user's files for data, and operating system instructions, and journal files and reservation files, all of which repetitively broadcast the contents of memory via a moving memory bus within dissimilar repetition intervals.

20 Claims, 10 Drawing Sheets

MICROCELL COMPUTER SYSTEM AND METHOD USING CELL ACCESS SWITCH AND FUNCTIONALLY PARTITIONED MOVING MEMORY ARCHITECTURE

This is a continuation of application Ser. No. 07/928,917 filed on Aug. 12, 1992, now abandoned, which application is a continuation-in-part of pending application Ser. No. 07/791,894 entitled "Microcell Computer System and Method Using Cell Access Switch And Moving Memory Architecture", filed on Nov. 13, 1991 now abandoned by M. M. Atalla.

BACKGROUND OF THE INVENTION

This invention relates to computing equipment including multiple microprocessors, and more particularly to parallel processing and multi-user multi-tasking systems.

Modern high performance computing systems achieve their high performance by using high speed processors and rapid-access memories. Techniques such as cache memories and instruction pipelines provide an additional increase in performance. Complex operating systems are commonly used to allocate computing resources to provide multi-user and multi-tasking operation. Even more complex operating systems are required to insure continued system operation without loss of data when systems components fail. System components are typically interconnected by using time division multiplexed buses. When the number of system elements becomes large, the system performance can become limited by the bus bandwidth.

SUMMARY OF THE INVENTION

The computing system of the present invention provides high performance without requiring the complexity of high performance computing elements and memory modules. The system architecture is oriented toward the provision of dedicating computing capability to any number of independent users with computing tasks ranging from simple to complex. A moving memory provides rapid access to the memories for a large number of system elements without complex techniques. The use of many simple computing units or microcells provides high performance without necessarily requiring high performance processors. The bus bandwidth limitation is eliminated by using a cell access switch that provides a circuit connection using a telephony type of switch.

The operating system is simplified by dedicating certain computing resources to an input/output device until the computing resource completes the task required by the input/output device. High reliability is achieved by the multiple processor configuration and the allocation of computing resource to the completion of tasks.

The Moving Memory Architecture (MMA) computing system of the present invention can be used for multi-user multi-tasking applications and complex problem solving using parallel processing. The MMA computing system includes computing microcells which use standard microprocessors at low cost. A microcell may contain a single processor or multiple processors. The single processor microcells are for simple computations, while the multiple-processor microcells can be assigned to users whose application programs require increased computing power. Also, custom, special purpose microcells can be provided with custom microcircuits using multiple standard microprocessors. The moving memory provides rapid access to data for operating systems, applications programs, and data bases. Multiple segments of the moving memory may be individually based in different memory modules that provide stored information on individual bus conductors at individual repetition intervals.

Circuit switching provides efficient interconnection between microcells and user terminals or I/O devices. The system can operate compatibly with existing standards for multiple operating systems and network/communications standards. Security and controlled access can be provided conveniently and high reliability is provided via natural redundancy. Task oriented operation provides a natural partitioning for parallel processing and adaptive allocation of computing microcells to assure efficient load balancing, and specialized microprocessors can be accessed for performing particular tasks such as graphics displays. The present invention provides a computing system which is an efficient server for such multi-user, multi-tasking applications as multi-user computing systems (PC's, X-Windows), switched dedicated access systems, multiple operating systems, networking, on-line transaction processing, and the like. In addition, the present invention is operable as a massively parallel processing systems for such applications as CAD, 3-D graphics displays, and simulation/modeling in diverse fields such as weather forecasting, electronic circuit modeling, microbiology, aircraft simulation, and the like.

The MMA computing system of the present invention includes interconnection of computing microcells, moving memory modules, a cell access switch, gateways to external devices, random access memory modules (RAM), and input/output channels. There can be several computing microcell configurations. The simplest case is a single microprocessor which performs both the task management function and the task processing function. In more complex computing microcells, the task management function is performed by a "nucleus" processor, which is connected to multiple "satellite" microprocessors, to perform the computing sub-tasks. The nucleus processor directs the satellite microprocessors to perform their subtasks. The nucleus processor assembles the results of the subtasks and responds to the input/output device.

The MMA computing system of the present invention uses standard microcells which access moving memory data access method to provide rapid access to shared data with low overhead. The moving memory module provides access to shared data such as operating systems, applications programs, and data bases using a broadcast data distribution technique to all microcells. The input/output devices are connected to the computing microcells by the Cell Access Switch which uses telephony-type circuit switching to provide an efficient and reliable method of accessing a large number of microcells. The cell access switch allocates system resources and controls cell access connections in a manner similar to that which a telephony switch uses to route calls via available circuits. The MMA computing system of the present invention provides a high performance multi-user system that is reliable due, in part, to the natural redundancy, and that is also modularly expandable, compatible with existing standards, and cost effective due to the use of standard microprocessors in the computing microcells.

DESCRIPTION OF THE PREFERRED EMBODIMENT

Figure 1:
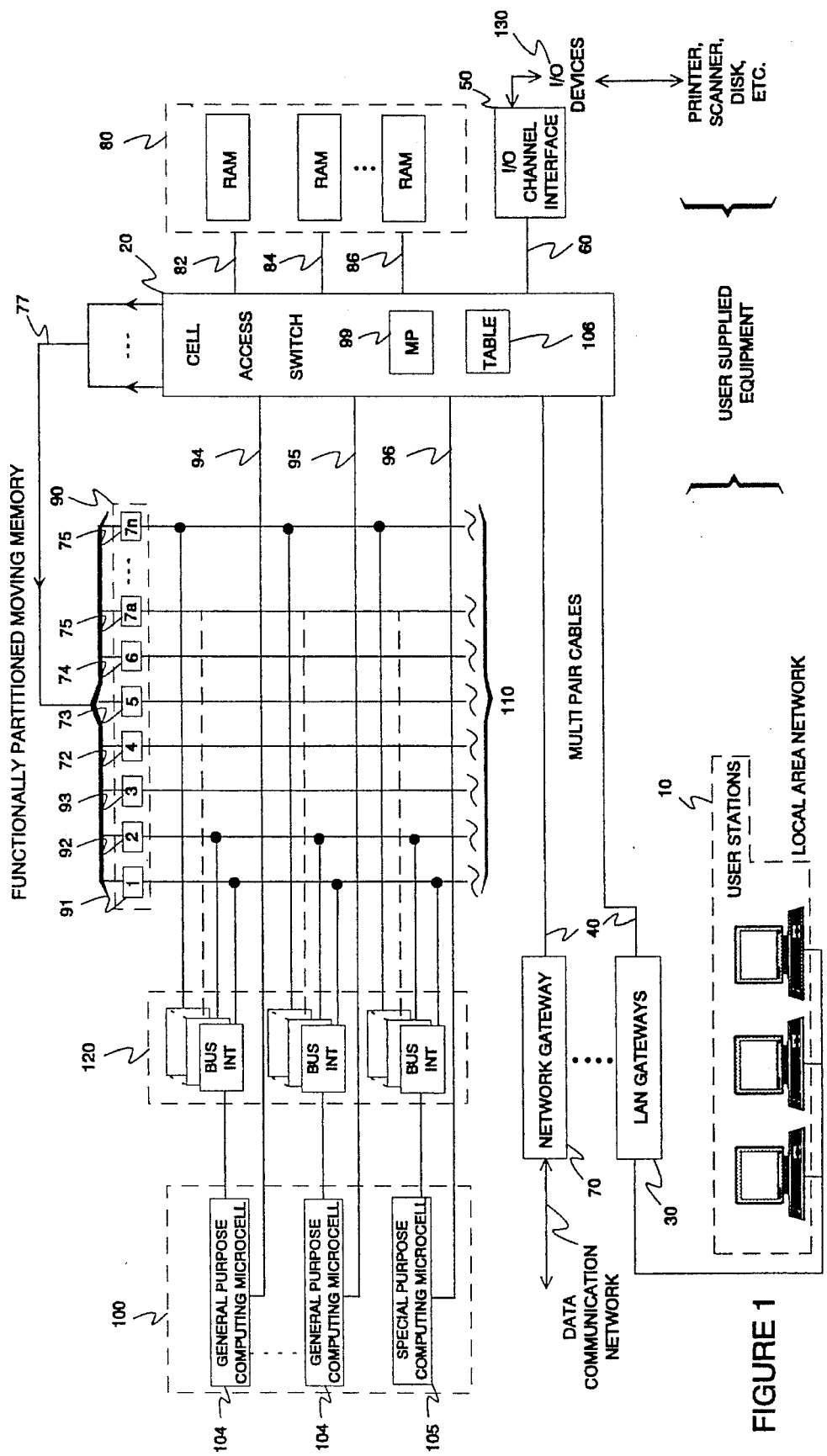
FIG. 1 is a simplified block schematic diagram of an improved embodiment of the MMA computing system according to the present invention.

Referring now to the block schematic diagram of FIG. 1, there is shown an illustrated embodiment of the present invention in which user stations 10 are connected to the cell access switch 20 via one or more Local Area Network (LAN) gateways 30. The connections between the LAN gateways and the cell access switch 20 are multi-pair cables with at least one pair for each user station 10. The computing microcells 100 are directly connected to the cell access switch, 20. User-supplied I/O devices such as printers, scanners, disk memories, and the like, are connected to the cell access switch 20 via a typical I/O channel 50 or LAN. The I/O channel interface 50 is connected to the cell access switch 20 via a multi-pair cable 60. The network gateway 70 is also connected to the cell access switch 20 to provide access to the standard data communication networks.

There may be several types of Moving Memory Modules (MMM) 90 such as the operating system memory 91, the application program memory 92, a journal file 93, an instruction file 72 for data access, an on-hold file 73 for user data, a record reservation file 74, and one or more user record files 75. Each memory module 90 is connected to the computing microcells 100 via a multiple access bus 110 and a bus interface module 120. The contents of each moving memory module 90 are sequentially read out and broadcast or otherwise transmitted to all computing microcells 100 via the conductors or channels of the Moving Memory Bus (MMB) 110. Each computing microcell 100 has it's bus interface 120 to select the desired data as it is transmitted via the MMB 110, as later described in detail herein.

Specifically, the operating system moving memory module 91, may contain several different operating systems and may be further partitioned into functional subsystems per stored operating system to conserve RAM in a computing microcell 104, 105. The application programs and common data may be stored in moving memory module 92 and may also be further partitioned into functional subsets (or moving memory modules) for convenient repetition intervals. The journal moving memory module 93 may be used to store user records that have been changed but not updated on a user's own record moving memory module 75. The journal file 93 is therefore monitored in parallel with the user's record moving memory, and the journal file 93 takes precedence over the user's record file. There may be one or more entries for a given User ID No. in the journal file. The record with the highest Record No. will be used. If there are no entries in the journal file, the user file record is used. The journal file 93 may be condensed and faster than user records. When an updated user record is in the journal file, the user's transaction will be processed faster. Active user entries may thus show up in the journal file while inactive user entries remain in user records. Journal file entries may be transferred to user records during low-priority processor intervals. The instructions for data accesses, for example, from modules 91, 92 or 75 in order to perform a particular task are stored in moving memory module 72. One example would be stored information in module 72 that indicates which operating system, application program, common data and user data are needed from the respective modules to perform a specific task. This module may be relatively small to provide rapid recycling of instructions for such data accesses that can then proceed substantially in parallel. The on-hold user data module 73 is effective to retain state information, partial results and other data needed to resume processing of a task that is interrupted for any reason prior to completion. The record reservation file 74 helps to resolve contentions for a common record among multiple users in the manner later described in detail herein. One or more moving memory modules 75 may be provided, depending upon the number of potential users expected on the system, for storing a particular user's task-oriented data such as associated with graphic displays, spreadsheet data, word processing files, and the like.

These functional partitions of moving memory conserve data integrity and greatly facilitate multi-task, multi-user processing, for example, in the processing of two or more transactions using the same user record such record should be made available in updated form to the users in the proper sequence by delaying one access until a priority transaction is completed. In normal operation without access conflicts, the user record is read from one of the moving memory conductors or channels 110, updated as a result of the transaction being processed, and the updated record is then written on a journal file 93 for future processing. The record on the journal file 93 is then used for future transactions until the original user record 75 is updated. The journal file 93 is read in parallel with the user files 75, so no processing time is lost.

The conflict of two users requesting simultaneous access to the same record can be resolved by adding a moving memory module which serves as a reservation file 74. This moving memory module can be quite small to provide a short transmission cycle. While a microcell 100 is monitoring the journal file 93 and user files 75 for the user record, it also sends a reservation request to the reservation moving memory module 74 via the cell access switch 20. Conflicts for simultaneous access to the reservation moving module 74 are resolved by the cell access switch 20. When a blank space is located, a controller for the reservation moving memory module 74 writes the ID number of the microcell 100 being granted the reservation and the user ID in reserved locations within the blank record. It also sends the same data over the reservation moving memory bus 110. If another microcell 104, 105 attempts to use the "reserved" record, it will detect the reservation record on the reservation line and delay its processing until the updated record is available and the reservation is cleared. Since the file is reserved during the same time that moving memory is being scanned for the user record, no time is lost in normal transaction processing. Only when a conflict is detected will a delay occur.

FIG. 1 shows a connection 94–96 from each microcell 104, 105 to the cell access switch 20 and connections 77 from the cell access switch to the moving memory modules 90. These connections are used to update the moving memory modules.

The connections from user terminals or other user access devices such as LAN gateways commonly include a method of signaling. The connections 94–96 from the microcells 100 to the cell access switch 20 also include a method of signaling. This may be a separate signaling connection or imbedded signaling where the signaling and data are multiplexed over the same connection.

When the microcell 104, 105 requires access to the moving memory module 90, it notifies the cell access switch 20 via the signaling channel 94–96. The cell access switch 20 suspends the connection to the user terminal and provides a connection from the microcell 100 to the moving memory module via lines 77. In cases where the microcell needs simultaneous access to the user terminal and the moving memory module, there may be two data paths between the cell access switch 20 and the microcell 100. Also in cases where one connection from the cell access switch 20 to the moving memory modules 100 is not sufficient, then multiple connections may be provided.

If more than one microcell 100 attempts to gain access to update the same moving memory module 90 at the same time, the cell access switch 20 resolves the conflict by arbitrarily giving the microcell 100 with the lowest ID number priority. If there is more than one connection from the cell access switch 20 to the moving memory module 90, the controller for a moving memory module resolves the conflict in a conventional manner if two microcells request to reserve the same record at the same time by giving the microcell with the lower ID number the priority access to the record.

Figure 2:
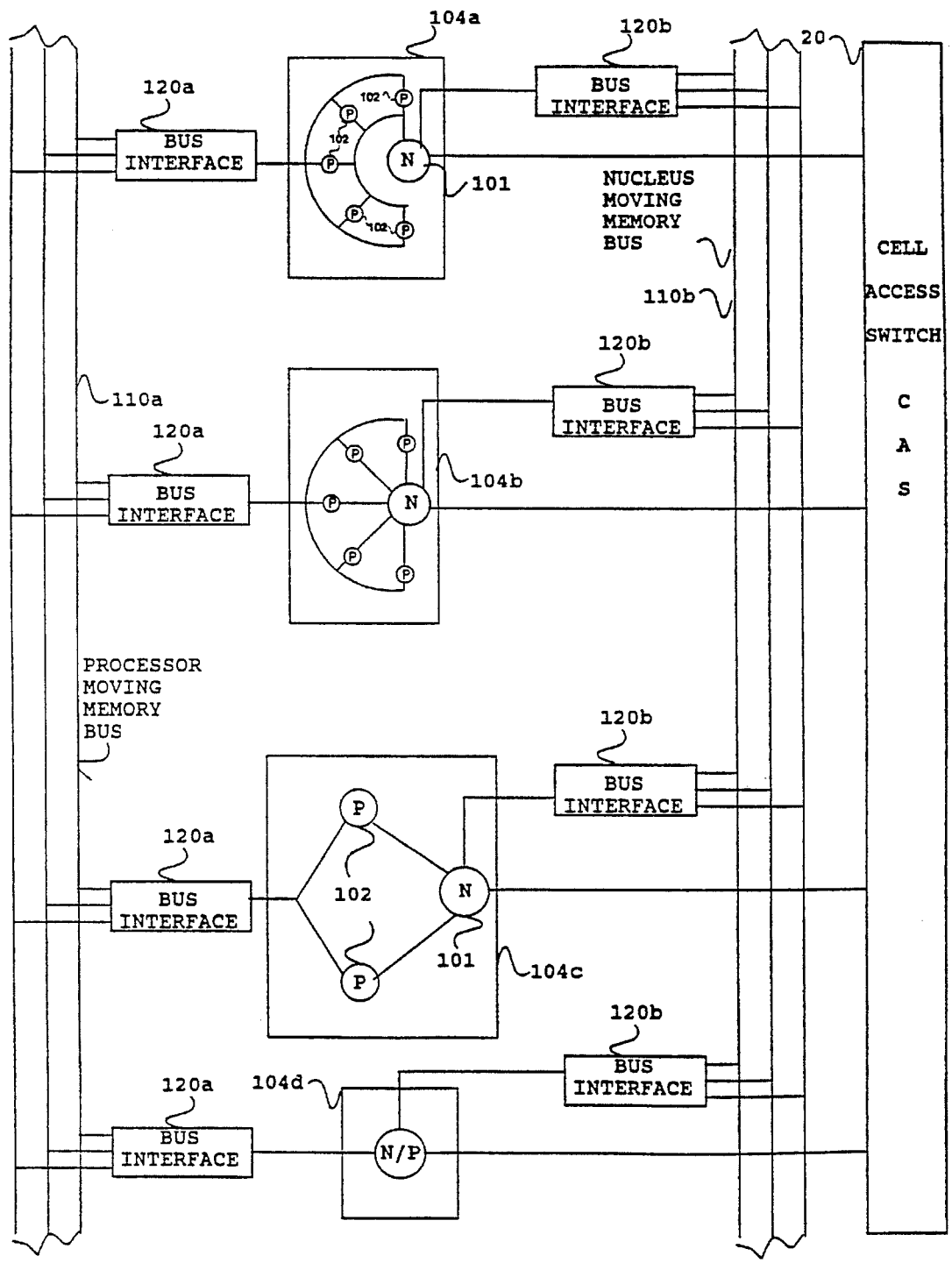
FIG. 2 is a block schematic diagram of various computing microcell configurations according to the present invention.
Figure 6A:
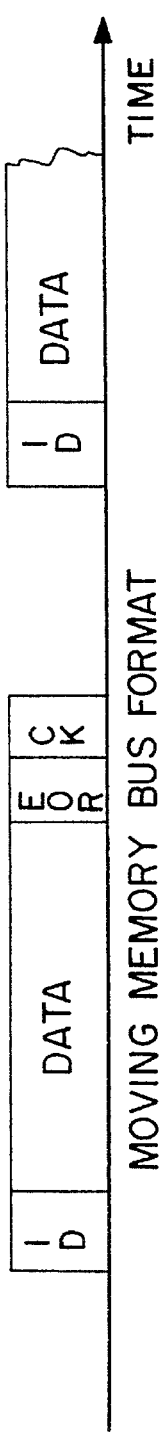
FIGS. 6 (a)–(c) are graphs illustrating operational data formats in the illustrated embodiment of FIG. 1.

There are several types of computing microcell configurations, as later described herein with reference to FIG. 2. The computing microcells 104, 105 form an array as shown in FIG. 2 with the nucleus processor 101 for each microcell 104 connected to the I/O device via the cell access switch 20. Both the nucleus 101 and satellite processors 102 have access to the moving memory bus 110, as shown in FIG. 2 to form one or several similar bus-oriented multiple-processor microcells. FIG. 2 shows a star-configured multiple processor microcell 104b with a dedicated connection for each satellite processor 101 that is connected to the nucleus processor 101. The bus configured multiple processor microcell 104b shown in FIG. 2 may be used when there are, for example, four or more satellite processors 102, While the star configured multiple processor microcell 104b may be used with four or less satellite processors 102. The format of the data on the MMB is illustrated in FIG. 6(a). The MMM sequentially transmit its contents over the MMB using this format. The Bus Interface (BI) 120 is given the ID of tie record to be read by the Computing Microcell (CM) 100. The BI 120 monitors the selected MMB looking for the ID of the desired record. When the desired record ID appears on the MMB, the following contents of the MMB are transmitted to the CM's working memory.

FIG. 2 shows a two-satellite processor configuration 104c. Thus, in each configuration of computing microcell the nucleus processor 101 has access to the nucleus moving memory bus 110 and cell access switch 20, and each satellite processor 102 has access to the processor moving memory bus 110. FIG. 2 shows a single processor 104d configuration as the simplest configuration with the single microprocessor performing the interface to the cell access switch 20 and the moving memory bus 110 access, task management, and computing functions.

Figure 5:
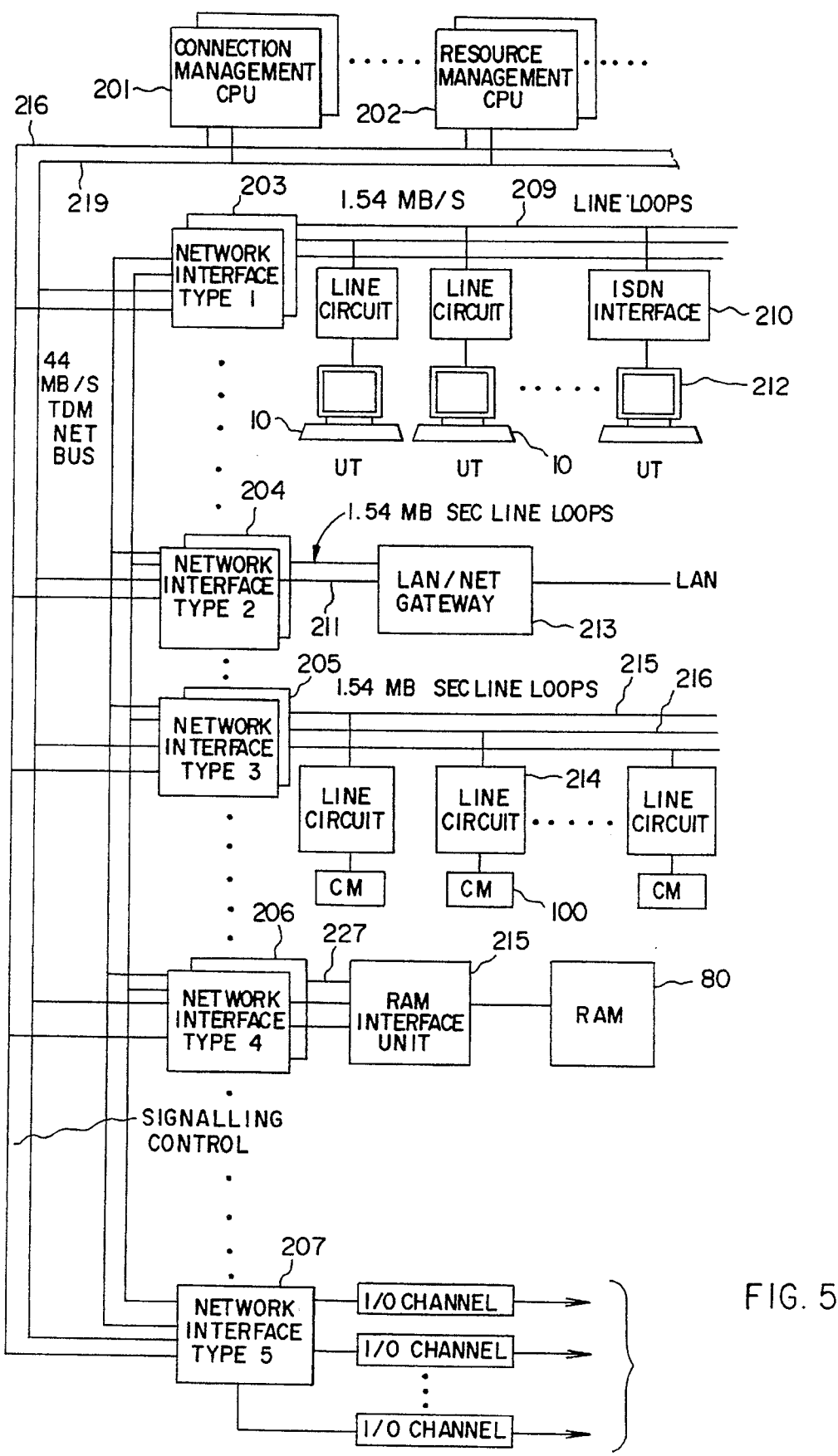
FIG. 5 is a block schematic diagram of the call access switch according to one embodiment of the present invention.

The cell access switch 20 receives requests for computing resources from the user stations 10 or I/O devices 130 in a manner similar to the dialing information provided by a telephone handset to a telephony switch. There may be a common signaling channel which may be used, as illustrated in FIG. 5. The signaling format used in the Integrated Systems Digital Network (ISDN) may be used to provide 64Kb/s channel capacity with 23 data channels or time slots (TS) and one 64Kb/sec signalling time slot per 1.54Mb/s circuit. Its use is preferred since ISDN is an emerging technology and integrated circuits using current semiconductor technology are available.

The cell access switch 20 maintains the status of all system elements and allocates system elements to perform tasks as required. The cell access switch 20 makes the assignment of the computing resource to the task requested by the user station 10 or I/O device 130 and sets up a dedicated connection.

The task request from the user station is analyzed by the cell access switch 20 to determine the processing requirements of the task. The application program may require special purpose computing microcells 105 such as a conventional math co-processor or graphics processor to perform specific types of sub tasks, or may require more complex microcells with multiple microprocessors.

The cell access switch 20 is a time-division multiplexed non-blocking switch with 64Kbit/sec data channels. The switch has several 1.544Mbit/sec Switching loops which provide 24 data channels of 64Kb/sec each. The switching loops are interconnected by 6.312 mb/sec or 44.726Mb/sec bus, depending on system size. Standard integrated circuits which are manufactured inexpensively in high volume for use in standard telephony may be used.

The network gateway 70 provides access to standard data transmission networks to communicate with other processors. The network gateways are assigned by the cell access switch 20 in the same manner as the assignment of the computing microcells and are connected to the appropriate computing microcell 100 or user station 10 by the cell access switch 20.

In the embodiment of the present invention illustrated in FIG. 1, the I/O devices 130 may include 'dumb' terminals with conventional network interface electronics, or intelligent terminals, or document scanners, or point-of-sales terminal, or the like. The moving memory modules 90 may include operating system memory 91 containing object code for such conventional operating systems as Microsoft DOS, Unix, Windows or other. The memory modules 90 may also include application program memory 92 containing object code for such conventional applications as word processing, spread sheets, CAD, On-Line transaction processing, logic simulation, and the like, for broadcast or other delivery transfer, for example, by electrical wire connections, or fiber optic connections, or infrared transmission to all computing microcells 100.

The single processor computing microcells 104d, as illustrated in FIG. 2 may include a general purpose RISC-based or conventional processor, or may include special purpose processor such as a graphics processor, or an array processor, or the like, for use in general computational tasks or data communications encoding, or the like. The multiple processor computing microcells 104a, 104b, and 104c, as illustrated in FIG. 2, may be arranged in star configuration for typically 4 or less satellite processors 102, and a single nucleus processor 101, or in a bus configuration for typically four or more satellite processors 102 and a single nucleus processor 101 to accomplish more complex computational tasks or special computation requirements such as logic simulation or CAD/CAM or graphic computations and displays.

There are two types of moving memory buses 110a, 110b shown in FIG. 2. The processor MMB 110a transmits, broadcasts or otherwise distributes the data and application programs in processing the transactions or user's computation. The nucleus MMB 110b similarly transmits, broadcasts or otherwise distributes the application programs and operating system segments that are needed to manage the interconnection between the computing microcell 104 and the cell access switch 20. The nucleus processor 101 provides the logical interface between the user terminal 10 and the processors 101, 102 within the computing microcell 104. Those parts of the operating system and application program that relate to such logical interface are distributed on the nucleus MMB 110b.

The bus interface units 120 interconnect each microcell 100 to a memory module 90 via the respective conductors or channels of the moving memory bus 110 in order to access the selected modules 91–93, 72–75 for operating systems, applications programs, data base information, user file information, instruction file information, and the like, of the type illustrated, for example, in FIG. 6 that is later described herein.

The network gateway 70 may be of any conventional type such as ISDN, X.25, or the like, for remote communications with other computing systems, including security checking and controls, or the like.

The local area network gateway 30 provides an interface using conventional LAN protocols to the multiple work stations 10 via the cell access switch 20.

The cell access switch 20, as previously described, generally receives signalling data on lines 94–96 from computing microcells 100 to set up connections between the various elements such as user stations 10 and I/O devices 130 and gateways 30, 70, and RAM 80, and memory modules 90. The cell access switch 20 also maintains system status.

The I/O channel interface 50 provides interface to I/O device 130 via standard I/O channel protocols, and provides multi-pair interface 60 to the cell access switch 20.

There are generally two modes of operation of the computing system according to the illustrated embodiment of the present invention. In the one mode of transaction processing, the system modifies a data file at the completion of a transaction, and in another mode of computational tasks, the system performs some computation on data supplied by the I/O device 130 and then returns the result to the I/O device.

When an I/O device 130 requests processing resources, it signals the cell access switch 20 and provides the cell access switch 20 with the identity of the application program to be run. The cell access switch 20 maintains for each application program a table 106 in memory which defines the type of computing microcell 100 to be used.

The cell access switch 20 maintains the status of the computing microcells 100, and identifies an available computing microcell 100 of the type required by the application program, assigns it to the I/O device 130, establishes a connection between the I/O device 130 and the computing microcell 100, and provides the computing microcell 100 with the identity of the application program. The computing microcell 100 then acquires the application program from the appropriate moving memory module 90. The application program thus retrieved then defines the mode of operation.

More specifically, in the transaction processing mode of operation, the application program Obtains the user ID from the I/O device 130 and monitors both the journal MMB and the user record MMB for the user record. At this same time, the application program requests a reservation of the user file from the reservation MMM via a connection provided by the cell access switch 20 to the computing microcell.

Thus the I/O device 10 or 13 provides the data regarding the transaction to be processed to the computing microcell 100 via the dedicated connection established by the cell access switch 20. The I/O device 10 or 130 retains the transaction input data until the transaction has been processed, the updated record has been written on the journal file, and the computing microcell 100 has notified the I/O device 10 or 130 that the transaction has been completed. If the application program provides for redundant data storage, the redundant file is also updated before the I/O device 10 or 130 is notified that the transaction is completed. If there is a component failure which inhibits the transaction from being processed, the I/O device 10 or 130 may time out the assignment and thereafter request the cell access switch 20 for alternate processing resources. The I/O device 10 or 130 then, in effect, requests an alternate computing microcell to process the transaction. The I/O device provides the alternate computing microcell with a transaction number to insure that a partially processed transaction has not altered the user's data file or journal file.

Once the transaction has been processed, the connections from the computing microcell 100 to the user's record file and the journal file via the cell access switch 20 are released.

In the computational mode, the I/O device 10 or 130 supplies the application program with the input data. The computing microcell 100 may have enough local memory (not shown) to perform the computing task, in which case the computation is performed and the results are returned to the I/O device directly. If the computing microcell requires additional memory, the application program requests the cell access switch 20 to allocate the required RAM 80 memory and provide a connection to the appropriate RAM module port. Once the computational task has been completed, the computing microcell and RAM port are released.

Figure 3A:
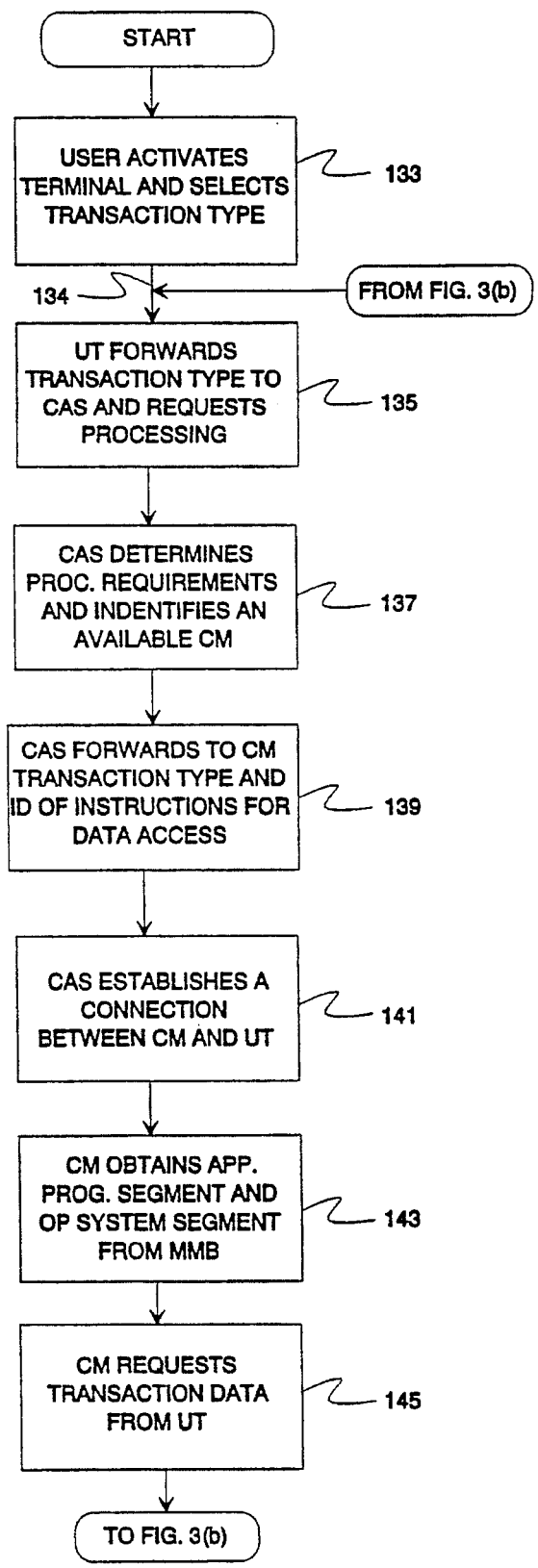
FIGS. 3(a) and 3(b) comprise a flow chart illustrating the operation of the embodiment of the system of FIG. 1 in the transaction processing mode.
Figure 3B:
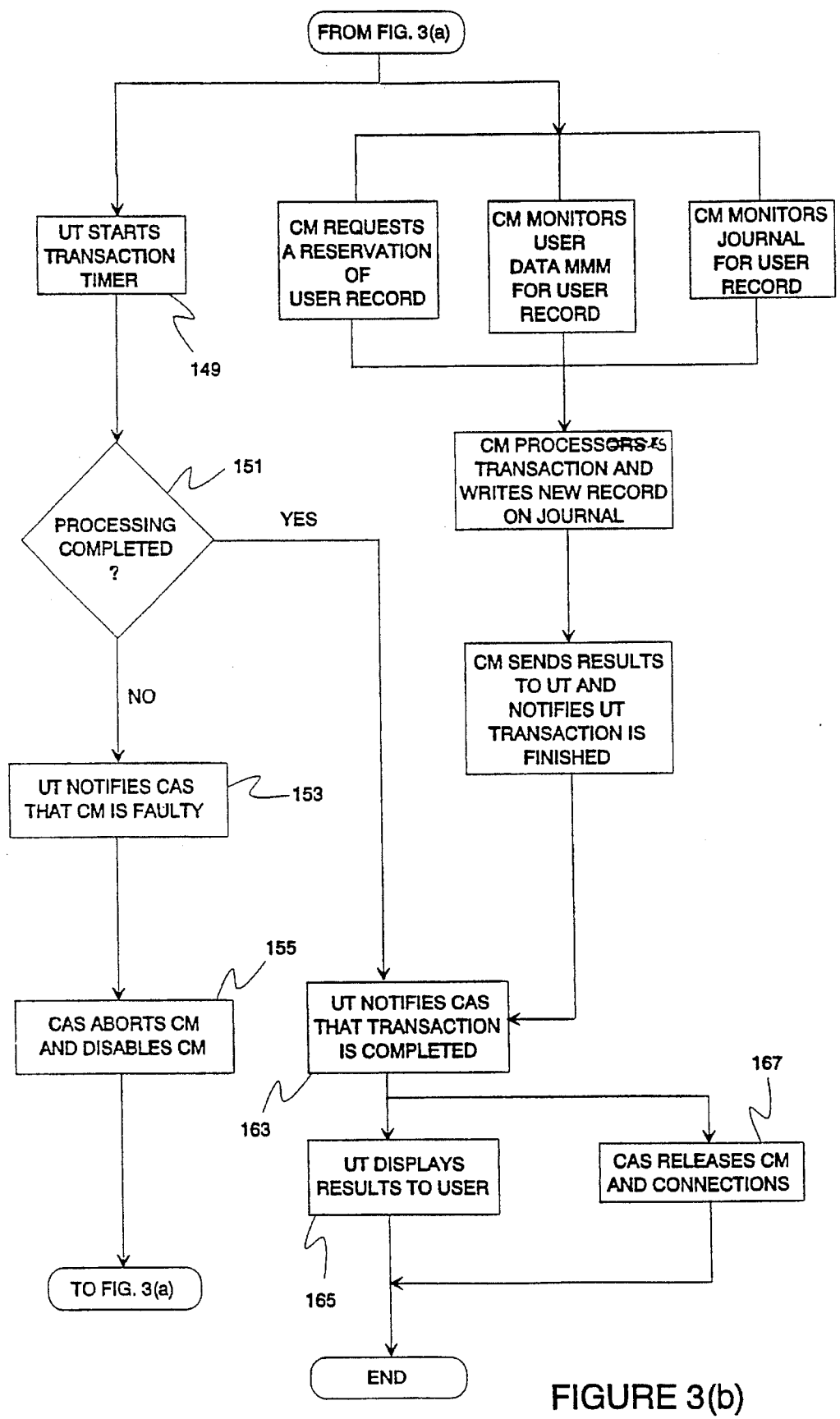

Referring now to FIGS. 3(a) and 3(b), there is shown a flow chart illustrating operation of the present invention in the transaction processing mode. The process starts with the user activating 130 a user terminal or station 10 to select a transaction type. As an example, the user terminal (UT) can be an automatic teller machine (ATM) used for completing such typical financial transactions as 1) deposit, 2) withdrawal, and 3) balance inquiry at a banking institution. The user terminal forwards 135 the transaction type to the cell access switch (CAS) 20 and requests processing. This is accomplished via a multi-pair cable 40, shown in FIG. 1, in a manner similar to the signaling between a telephone handset and telephony central-office type switch. The processor 99 in the cell access switch 20 maintains a table 106 which gives the processor requirements and identification of the master program for each type of application program that is stored in memory module 92. The cell access switch (CAS) 20 determines 137 the processing requirements for the transaction type selected by a user from that table. The cell access switch 20 also includes in the table 106 a list of available computing microcells (CM) 100. The cell access switch 20 selects an available computing microcell 104, 105 of the appropriate type and assigns it to process the transaction. The cell access switch 20 then forwards 139 to the assigned microcell the transaction type and the identification of instructions for data access, and sets up a connection 141 between the computing microcell 100 and the user terminal or station 10.

The designated computing microcell 100 monitors the appropriate moving memory bus (MMB) 110 for the broadcast or appearance thereon of the required application program. When the application program is available 143 on the bus, it is loaded into the memory of the computing microcell 100. The application program identifies the operating system segments that are needed for each operation, and the computing microcell uses this data to select the required operating system segments from the moving memory bus 110.

The computing microcell 100 begins the selected application program to process the transaction by requesting 145 the user terminal or station 10 to supply the transaction data. The user terminal 10 may prompt the user to provide the transaction data. In the example of an ATM given above, the user terminal 10 prompts the user to enter the appropriate banking data. Once the user terminal 10 has obtained the required data, the computing microcell 100 requests a reservations of the user record 147, and monitors the journal file for user record 148, and also monitors the user data moving memory module for user records. The user terminal which is connected via the cell access switch 20 starts a transaction timer 149. The user terminal 100 monitors the transaction timer (which may be a conventional register clocked to overflow) to determine if the processing is not completed within the specified time. If the timer times out before the processing is completed 151, this is an indication of a system failure and the user terminal 10 notifies 153 the cell access switch 20 that the computing microcell 100 has failed and requests another processor or computing microcell 100 to restart the process. The cell access switch 20 then takes the computing microcell 100 out of the list of available units 155 and sets an alarm to request maintenance. The process restarts 134 as shown in FIG. 3 (a) where the user terminal 10 forwards the transaction type to the cell access switch 20 and requests processing.

While the user terminal 10 is timing the transaction, the computing microcell 100 is processing the transaction and then writes a new record on the journal file 159. The computing microcell 100 sends the results to the user terminal 10 that the transaction has been processed 161 and returns any results to the user terminal 10 that are required by the particular transaction type. The user terminal 10 notifies 163 the cell access switch 20 that the transaction has been processed and displays 165 the returned data to the user. The cell access switch 20 then releases 167 the computing microcell 100 and removes the connections established during the transaction processing.

Figure 4A:
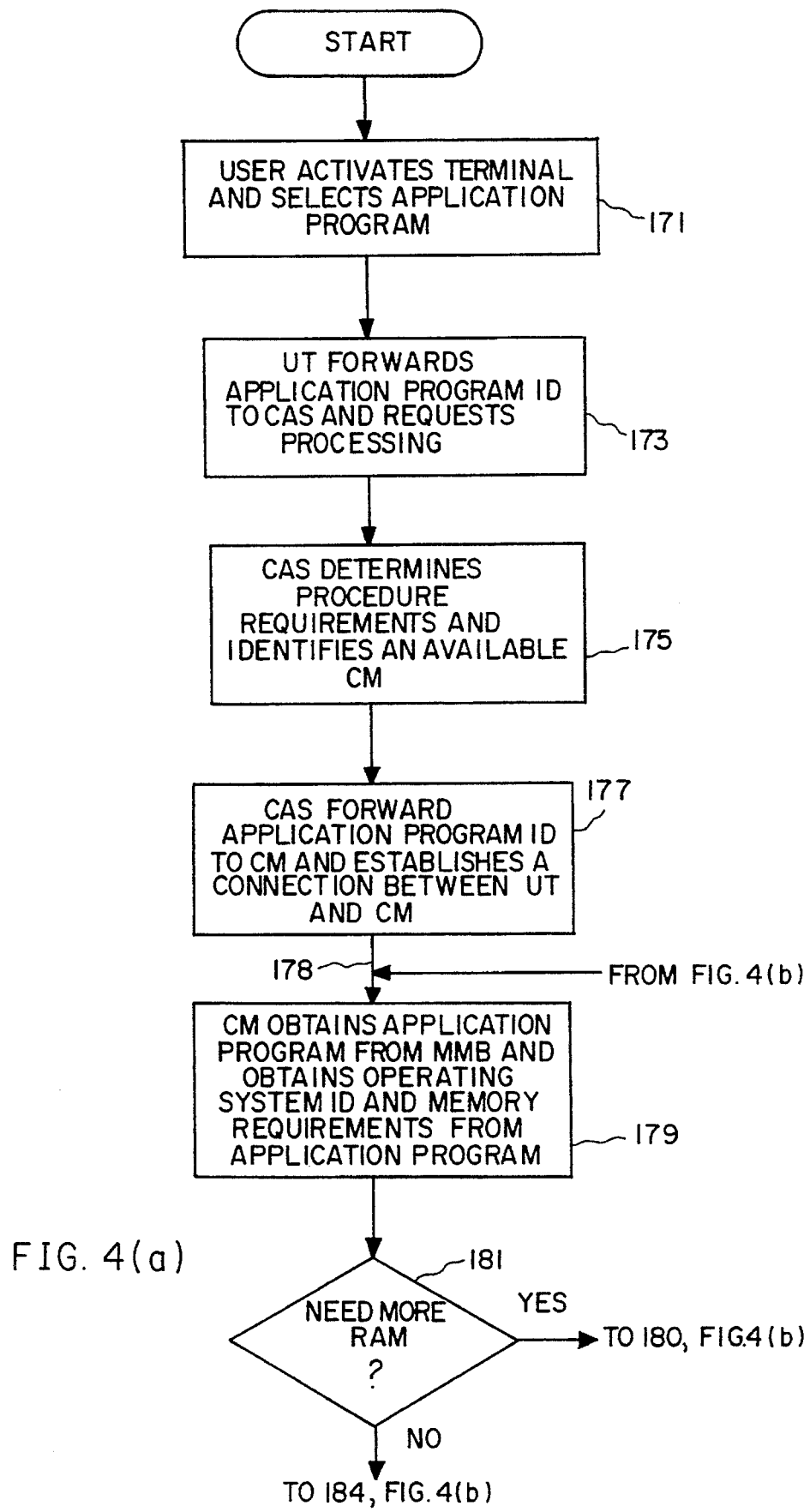
FIGS. 4(a) and 4(b) comprise a flow chart illustrating the operation of the system of FIG. 1 in the computational mode.
Figure 4B:
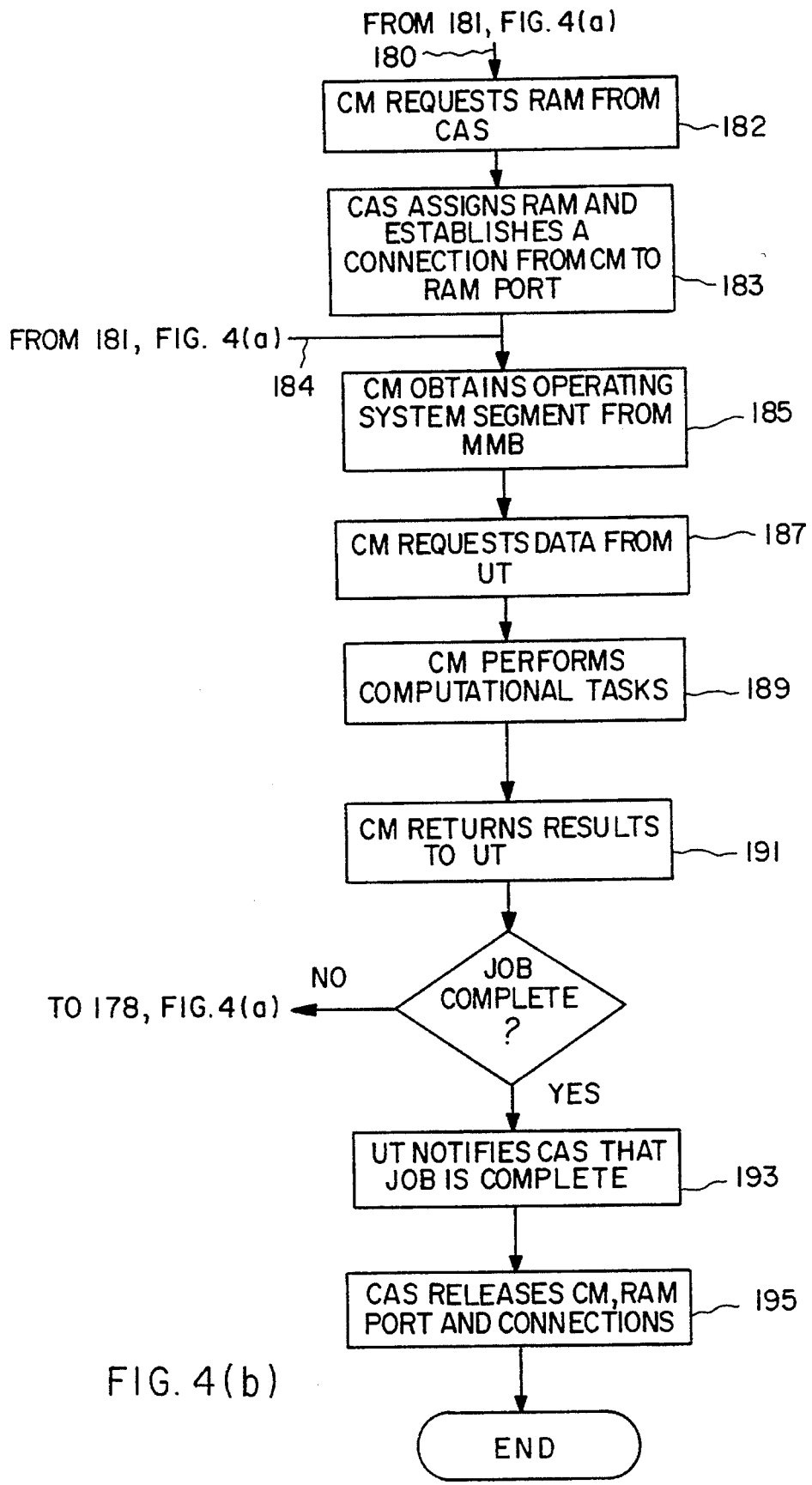

Referring now to FIGS. 4(a) and (b), there is shown a flow chart illustrating operation of the present invention in the computational mode. Operation begins when the user activates 171 a terminal 10 and selects an application program that is to be executed in the computational mode. The user terminal (UT) 10 forwards 173 the application program ID to the cell access switch (CAS) 20 and requests that a computing microcell (CM) 100 be assigned. The CAS has a table 106 of application programs available in the application program memory module 92 which gives the processing requirements for each application program. The CAS uses this table 106 to determine 175 the processing requirements for the selected application program to be run. The CAS then locates an available CM 100 with the processing capabilities required for the selected application program.

The CAS forwards the selected application program ID to the selected CM 100 and also establishes a connection 177 between the CM 100 and the UT 10. The application program may be too large to fit in the RAM of the CM. In this case the CAS provides several application program IDs, one for each segment of the total selected application program. The CM 100 then obtains 179 the application program or program segment by monitoring the moving memory bus ((MMB) 110 for the appropriate program or program segment ID. The application program provides the CM with the ID of the operating system segment required for the execution of the application program. The application program also provides the CM with the RAM requirements needed by the application program. If additional memory is needed 181, the CM 100 requests it 182 from the CAS 20.

The CAS 20 maintains a table 106 of available RAM 80 and RAM ports 82, 84, 86. The CAS 20 selects an available RAM port and assigns 183 the necessary RAM space. The CAS 20 then establishes a connection between the CM 100 and the RAM port 82, 84, 86 and notifies the CM 100 that it may proceed with its computation. The CM 100 then obtains the operating system segment 185 from the MMB 110. The CM then requests 187 the user data from the UT 10. Upon the receipt of the required data, the CM 100 performs the computational tasks 189 given by the application program or program segment. If after completion of the current segment, additional segments are to be executed, the CM 100 returns to the point where it obtains the program segment 179 from the MMB and follows the same sequence of operations until the application program has been completed. After the application program has been completed 191, the UT 10 notifies 193 the CAS 20 that the job is finished. The CAS then releases 195 the RAM and the connections between the CM 100 and the RAM port 82, 84, 86. The CAS 20 also releases the CM 100 and the connection between the CM and the UT 10.

Referring now to FIG. 5, there is shown a block diagram of the cell access switch (CAS) 20. This switch provides the functions of managing system resources and interconnecting system elements. In the illustrated embodiment, the CAS 20 is similar to a digital telephony type switch and uses the same data rates used in telephony switches so that integrated circuits manufactured in high volume for the telephony industry can be used in its implementation. The design of the CAS 20 is simplified by eliminating the need for interconnecting like system elements. For example, a UT 10 need not be interconnected to another UT 10 and a CM 100 need not be interconnected to another CM 100.

As illustrated in the embodiment of FIG. 5, there are two types of central processing units (CPU) in the CAS 20, including the connection management CPU 201 and the resource management CPU 202. Each of these CPU's has a processor, and I/O that interfaces to the signalling bus 216 and to the control bus 219, and sufficient random access memory (RAM) for proper operation.

There are five types of network interface units (NIU) 203–207 that also connect with the signalling bus 216 and control bus 219. Type 1 NIU 203 is used to directly connect local user terminals 10 to the switch. This type of NIU sets up the connection between the UT 10 and the assigned computing microcell (CM) 100. Each of the UTs 10 may be given a preassigned time slot on the line loop 209 within which to interconnect. The use of preassigned time slots is made possible by placing a restriction that UPs 10 are not connected to each other by the CAS. There are two 1.54 MB/s lines in the line loop which are used to provide 24 two-way connections between the NIU 203 and the line circuits 208. The format for the data on the line loop is illustrated in FIG. 6. There may be a common signalling channel or signalling may be embedded in data on a line loop using the ISDM format as previously described.

Type 2 NIU 204 is used to interlace to Local Area Network (LAN) or external network gateways 213. Like the Type 1 NIU, there is a 1.54Mb/s line loop 211 that is connected between the NIU 204 and the LAN/NET gateway 213. This provides for up to 24 simultaneous two-way connections to CMs 100. As with the Type 1 NIU 203, the time slots on the line loop 211 may be preassigned since the different Channels to the LAN/NET gateway 213 need not be connected to each other.

Type 3 NIU 205 is used to provide access to the CMs 100. Each Type 3 NIU can provide a connection to up to 24 CMs. As with Type 1 and 2 NIUs. The CMs do not need to be connected to each other, so they can be given preassigned time slot on separate one of their transmit and receive line loops 215, 216 for interconnection therewith via line circuits 214.

The Type 4 NIU 206 provides access to the user RAM 80. Since the basic data rate of the connection provided by the CAS is typically much slower than the RAM data rate, a single RAM unit can support multiple data ports in the illustrated embodiment. The RAM Interface Unit (RIU) 215 provides 24 bi-directional ports which can simultaneously be accessed by the CMs 100.

The Type 5 NIU 207 provides a connection between the CM 100 and conventional I/O channels to provide an interface to traditional computer peripherals such as printers, scanners, displays, and the like The resource management CPU 202 maintains system status information and assigns resources as required. When a UT 10 requests processing resources to satisfy the requirements of a transaction type, the resource management CPU 202 determines the processing requirements from a table in its memory and identifies an available CM 100 with the necessary computing capabilities from a system status table in its memory. The resource management CPU 202 then forwards the UT 10 identification, application program identification, and the CM 100 identification to the connection management CPU 201 which then forwards the application program identification to the selected CM 100 and instructs the appropriate NIUs 203–207 to establish a connection between the UT 10 and the CM via the control bus 219.

The connection management CPU 201 established the connection between the CM 100 and the UT 10 by first locating an available pair of time slots on the 44 MB/s TDM network bus 218. Like the line loops 209, 211, 215, 216, the network bus 218 has one bus for transmitting information from UTs 10 to CMs 100 and one bus for UTs 10 to receive data from the CMs 100. The connection management CPU 201 then forwards the time slot assignment to the NIUs 203–207 via the control bus 219. The appropriate NIU then sets up the logic to transfer the data to/from the line loop time slot preassigned to the UT 10 to the assigned time slot on the network bus 218. The NIU 203–207 that is connected to the assigned CM 100 also establishes the logic to transfer the data to/from the assigned network bus 218 slot to/from the predetermined time slot on the line loop for the assigned CM 100.

A similar process is used to establish a connection between the CM 100 and the appropriate RAM port or I/O channel when required.

The 44Mb/s network bus 218 can support up to 28 NIUs. Each NIU provides 24 circuits of 64Kb/s capacity. This provides up to 672 simultaneous two-way connections. When additional system capacity is needed, multiple network buses 218 can be used.

Figure 6B:
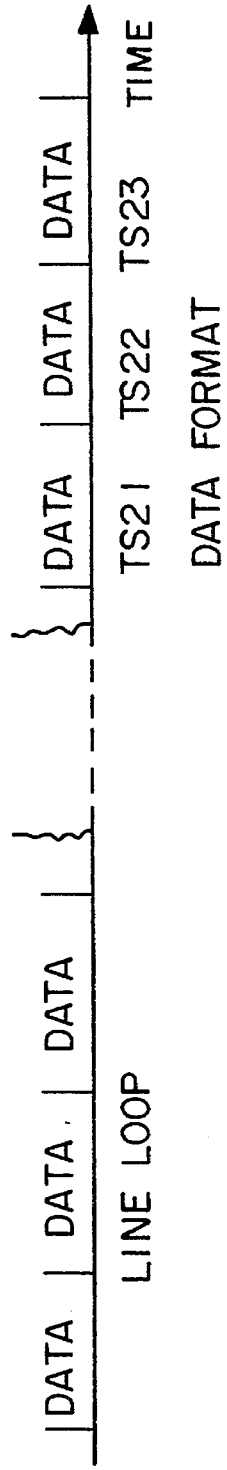
Figure 6C:
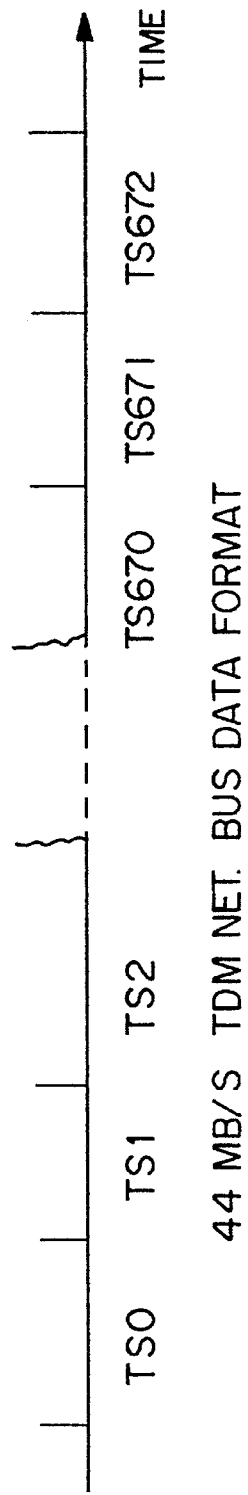

Referring now to FIG. 6, there are shown several charts (a)–(c) which illustrate the various data formats that were previously referred to in the foregoing description of the present invention. The data that appears on the moving memory bus 110 appears in blocks with time which are preceded by a block identification number (ID) and followed by an end of record (EOR) character and a check character.

The MMB Interface 120 monitors the selected bus for the requested block ID. When the requested ID appears on the bus 110 the bus interface 120 reads the data into a buffer in the interface until it recognizes an EOR character. The bus interface 120 then calculates the check data and compares it with the check character. If the check character matches the check data the block of data is forwarded to the computing microprocessor (CM) 100.

FIG. 2 shows two sections of the MMB 110 including the processor MMB 110a and the nucleus MMB 110b. Both of these buses have the same data format.

The line loops 209, 211, 215, 216, 227 contain three data paths; including one 1.544Mb/sec. path for data from the line circuits 208, 214 to the network interface 203, one 1,544Mb/sec. path for data from the network interface 203–207, and one 64 kb/s signaling path from the line circuits 208, 214 to the network interface 203–207.

The line loops use a format similar to the conventional T11.54Mb/s telephony transmission systems. The 1.54 Mb/s data stream is subdivided into 24 time slots, as illustrated in FIG. 6(b), one for each 64 kb/s data channel. Each time slot is eight bits. In T1 Systems the group of 24 time slots are followed by a framing bit to provide frame synchronization. This framing bit is not needed in the CAS architecture since the system is local and synchronous.

T1 transmission system use various methods of embedding the signaling in the data stream, but since the line loops are local, a simple 64 kb/s common channel for signaling between the line circuits 208, 214 and network interface 203–207 is used in addition to the 1.54 Mb/s data channel.

The network bus 218 uses a data format like the line loops but at a higher data rate of 44 Mb/s. This provides 672 time slots, as illustrated in FIG. 6(e), for interconnection between the network interface units 203–207. This provides enough capacity for 28 network interface units without blocking. For systems with more than 28 network interface units, multiple 44 Mb/s network buses 218 may be used.

Figure 7:
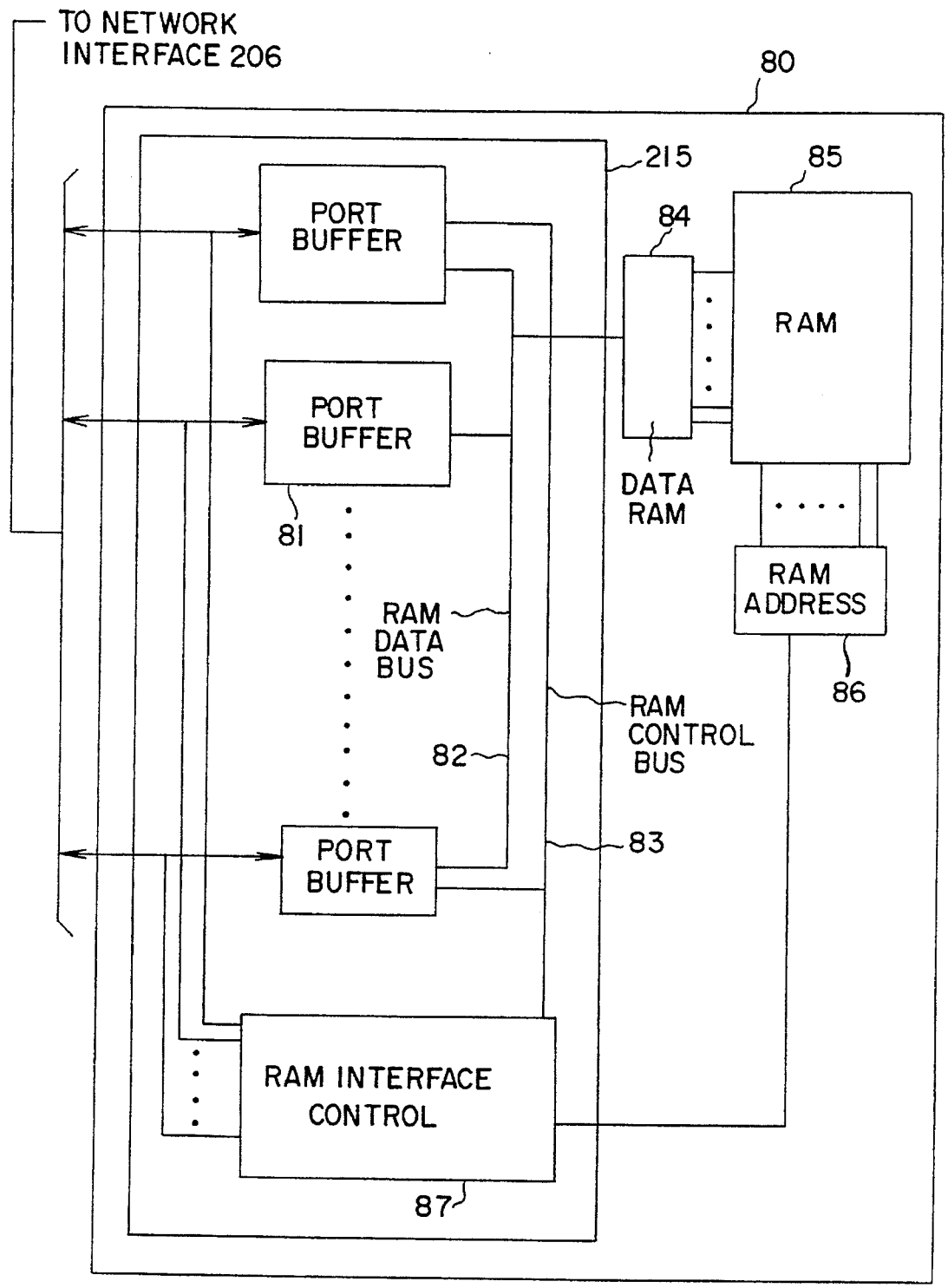
FIG. 7 is a block schematic diagram of a RAM interface unit.

Referring now to FIG. 7, there is shown a block schematic diagram of the RAM 80 module and the RAM interface unit 215. The RAM interface unit 215 provides 24 I/O ports to the network interface 206 of the CAS 20, as shown in FIG. 5. Each RAM port has a port buffer 81 which stores data to be stored in RAM, or read from RAM. After the CAS 20 has provided a connection between the CM 100 and a port of the RAM interface unit, the CM provides the RAM interface control 87 with the starting address, size of the block of data, and indication of whether the block is to be read or stored. If the block of data is to be stored in RAM, the CAS 20 then sends the data to the port buffer 81. When the block of data has been stored in the port buffer 81, the RAM interface control 87 selects the port buffer 81 via the RAM control bus 83 and loads the starting address of the data block into the RAM address register 86. The port buffer 81 then sends the data to be stored to the RAM data register 84 via the RAM data bus 82. The RAM interface control 87 increments the RAM address register 86 as each word is stored until the entire block of data is stored.

If the block of data is to be read from memory, the RAM interface control 87 sends the starting address received from the CM 100 to the RAM address register 86. The RAM interface control 87 also selected the port buffer 81 to receive the data from RAM via the RAM data bus 82. When the data block has been read into the port buffer 81, the RAM interface control 87 notified the CM 100 that the data is ready via the dedicated connection set up by the CAS 20. The CM 100 can then read the data from the port buffer 81 via the dedicated connection set up by the CAS 20.

Figure 8:
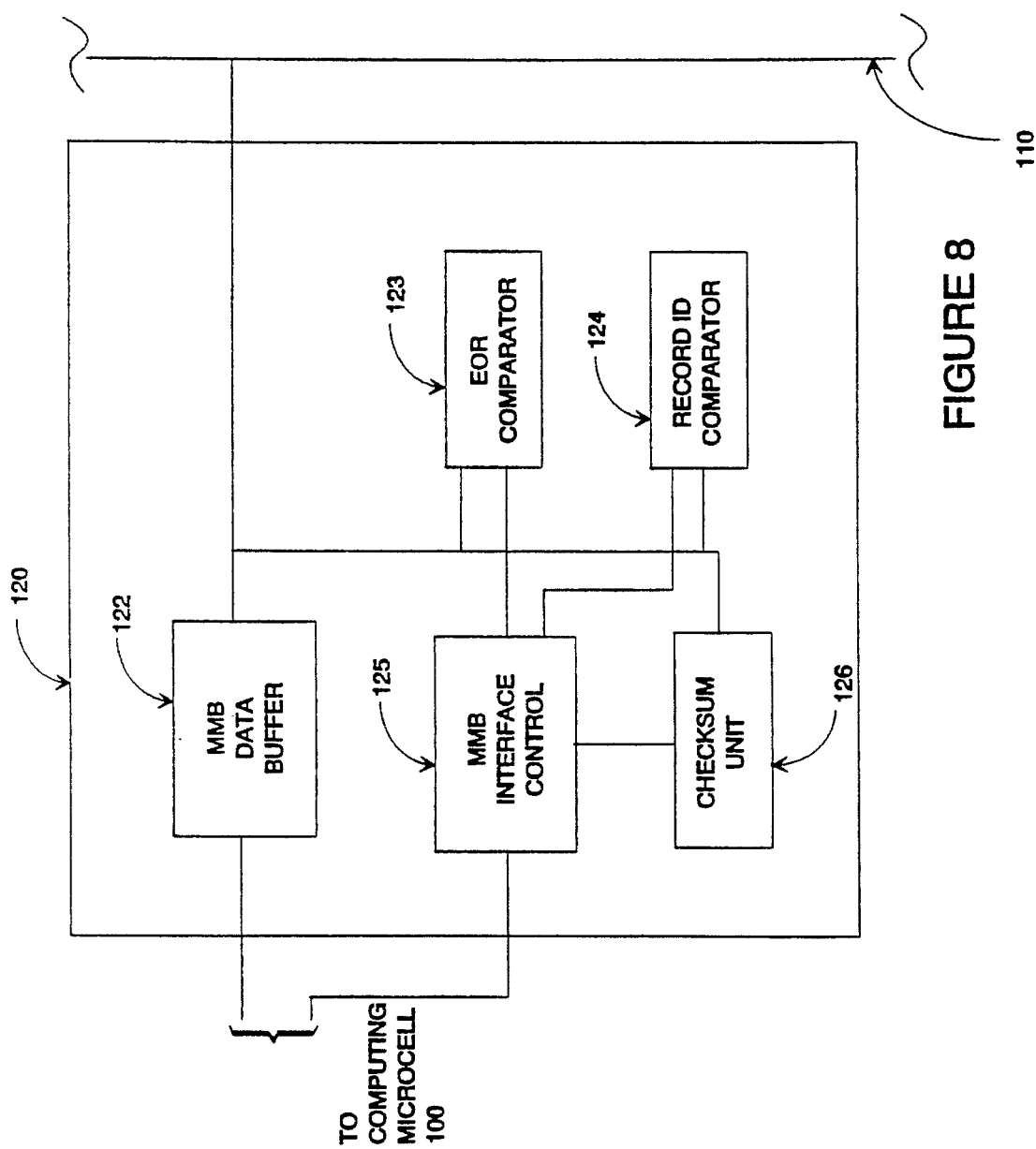
FIG. 8 is a block schematic diagram of a moving memory interface unit.

Referring now to FIG. 8, there is shown a block schematic diagram of the MMB interface unit 120. For the desired line of the MMB 110 being monitored, the desired record ID is provided to the MMB 110 interface control 125 by the computing microcell 100. The MMB interface control 125 also provides the record ID comparator 124 with the ID of the desired record. The data from the MMB 110 is routed to End Of record (EOR) comparator 123 and to a record ID comparator 124. When an EOR character is detected by the EOR comparator 123, a signal is sent to the MMB interface control 125 which then enables the record ID comparator to read the record ID of the next record on the MMB 110. If the record ID read from the selected MMB matches the desired record ID provided by the MMB interface control 125, the record ID comparator 124 provides a signal to the MMB interface control 125 which then sends a signal to the MMB data buffer 122 to read the next record, and the MMB interface control 125 also send s a signal to the checksum unit 126 to start computing the checksum of the record. When the EOR comparator 124 detects an EOR character, it signals the MMB interface control 125 which in turn causes the MMB data buffer 122 to stop accumulating stored data. At this time the MMB interface control 125 also sends a signal to the checksum unit 126 to stop computing the checksum of the record and to compare the computed checksum with the next characters received from the MMB 110, If the checksums match, the checksum unit notifies the MMB interface control 125 of the match. The MMB interface control 125 then notifies the computing microcell 100 that the data is ready in the MMB data buffer 122. If the checksums do not match, the checksum unit 125 notifies the MMB interface control 125 of the mismatch. The interface control 125 then notifies the computing microcell 100 of the mismatch and starts to monitor the MMB 110 for the next occurrence of the desired record.

Therefore, a computer system incorporating the moving memory architecture of the present invention provides rapid access to data by a large number of computing microcells without the concomitant queuing time commonly associated with bus-oriented computer systems. In addition, the use of telephony-type switches to provide system element interconnections overcomes the system performance limitations of conventional bus interconnections. Also, multiple-processor computing microcells can be formed in multiple configurations including a bus configuration in which a nucleus processor is connected to satellite processors via a bus, and a star configuration in which a nucleus processor is connected to satellite processors via dedicated connections. Further, moving memory modules distribute the stored information to the nucleus and satellite processors of the computing microcells via the moving memory bus and bus interface units. The moving memory modules may be functionally partitioned with parallel access to increase processing speed. The moving memory buses may be read-only buses with the MMM's updated via a connection thereto provided by the cell access switch. The integrity of data when two or more simultaneous accesses are requested can be assured by using a reservation MMM. The use of an on-hold file can provide an efficient scheme for resuming a task that that has been suspended for any reason.

I claim:

1. A method for operating a computer system having a plurality of user stations and at least one memory module for storing data and instructions in a plurality of segregated arrays and a signal bus in communication with said at least one memory module to provide said data and instructions to a plurality of computing unites having signal bus interfaces to select desired information that are each capable of performing logical operations on the stored data in accordance with the stored instructions, the method comprising the steps of:

sequentially and repetitively transferring via said signal bus the at least one of data and instructions from the at least one memory module substantially simultaneously to the plurality of computing units independently of requests therefor;

assigning cell access switch ports to selected ones of said plurality of user stations under the control of a processor;

assigning cell access switch ports to selected computing units under the control of said processor; and selectively coupling selected ones of the plurality of user stations to selected computing units through a cell access switch for performing logical operations on portions of a least the one of data and instructions selected from the signal bus by the signal bus interfaces for transfer to associated computing units by coupling cell access switch ports assigned to said selected ones of said plurality of user stations with cell access switch ports assigned to said selected computing units under the control of said processor in response to the computational requirement, of the plurality of user stations such that a communication path is created between said selected ones of said plurality of user stations and said selected computing units.

2. The method according to claim 1 wherein the plurality of segregated arrays of the memory module repetitively provide at least one of data and instructions at dissimilar repetitive intervals.

3. The method according to claim 1 in which the memory modules include user files for storing therein a user's own data and a journal file for storing therein user's data that has been changed but not yet entered in the user's files; and in which the bus interfaces substantially simultaneously monitor the user file and the journal files for records therein that are sequentially and repetitively transferred via the signal bus, with a record from the journal file taking precedence over a record from the user file.

4. The method according to claim 3 comprising the steps of:

designating records in said journal file for a user by a user identification number and a sequent record number; and selecting the record in the journal file with the highest record number for a selected user identification number for a computing unit to perform logical operation thereon.

5. The method according to claim 3 comprising the steps of:

designating records in said journal file for a user by a user identification number and a sequent record number; and selecting a record in the user file in the absence of a record in the journal file for a selected user identification number for a computing unit to perform logical operation thereon.

6. The method according to claim 1 comprising the steps of:

reading only data and instructions transferred from the at least one memory module via the signal bus to the bus interfaces for selection thereby and transfer to the associated ones of the computing units; and writing data and instructions to the at least one memory module via the selective coupling to a selected computing unit.

7. The method according to claim 1 wherein the memory modules include a reservation file for storing therein a reservation request, the method comprising the steps of:

storing in the reservation file a reservation request received from one of the computing units having an identification number designation; and repetitively transferring the reservation information from the reservation file via the signal bus to the bus interfaces for selection thereby and transfer to the associated computing units for detection by another of the computing units to delay logical processing of at least the one of data and information received from the at least one memory module until the reservation information is deleted from the reservation file.

8. The method according to claim 1 wherein said memory modules include an on-hold file for storing therein current status of logical processing of information; and comprising the steps of:

storing in the on-hold file the current status of logical processing of information for a selected user in anticipation of interruption of logical operations prior to completion thereof.

9. A computer system for operation from a plurality of user stations, the system comprising:

a plurality of computing units, each disposed to receive data and instructions for performing logical operations thereon;

a signal bus in communication with said computing units;

at least one memory module for storing at least one of data and instructions in a plurality of segregated arrays, the at least one memory module being disposed to sequentially and repetitively transmit on said signal bus the at least one of data and instructions from each of the plurality of segregated arrays of such memory module independently of requests therefor;

a bus interface associated with each of said plurality of computing units disposed between said computing units and said signal bus to receive the sequential and repetitive transmissions of the at least one of data and instructions from the at least one memory module for supplying to respective computing units portions of the at least one of data and instructions; and a cell access switch coupling selected ones of said plurality of user stations to selected ones of said plurality of computing units, wherein said cell access switch is operably disposed to create a communication path between said user stations and said computing units, said communication path carrying user data and instructions to said computing units directing said computing units to acquire data and instructions through said associated bus interface from said signal bus and further to return the results of logical operations on said data and instructions to said user stations, and wherein said cell access switch includes a plurality of signal ports at which the plurality of user stations and computing units are connected, and said cell access switch includes a processor coupled to the signal ports for controlling the coupling of the plurality of user station with the plurality of computing units in response to the computational requirements of the plurality of user stations.

10. The computer system according to claim 9 comprising a plurality of said memory modules disposed to repetitively transmit on the signal bus the at least one of data and instructions at dissimilar repetitive intervals.

11. The computer System according to claim 9 wherein said at least one memory module includes a user file for storing therein a user's own data, and a journal file for storing therein user's data that has been changed but not yet entered in the user hie; and the bus interfaces are coupled via the signal bus to the user file and to the journal file for monitoring the records therein that ate sequentially and repetitively transmitted, with a record from the journal file taking precedence over a record from the user file.

12. The computer system according to claim 11 wherein entries in said journal file are designated for a user by a user identification number and a sequent record number, and the record with the highest record number in the journal file for a selected user identification number is selected by a bus interface for an associated computing unit to perform a logical operation thereon.

13. The computer system according to claim 11 wherein records in said journal file are designated for a user by a user identification number and a sequent record number, and a bus interface selects a record in the user file in the absence of a record in the journal file for a selected user identification number for an associated computing unit to perform a logical operation thereon.

14. The computer system according to claim 9 wherein said at least one memory module reads data and instructions for transmission via the signal bus to said bus interfaces, and said switch means establishes a connection to the .at least one memory module for writing data and instructions thereto.

15. The computer system according to claim 9 wherein said at least one memory module includes a reservation file for storing therein reservation information via the switch means from a computing unit having an identification number designation, said reservation file repetitively transmitting reservation information via the signal bus to the bus interfaces for detection by another of the bus interfaces and computing units to delay logical processing of at least one of data and instructions received by the bus interfaces until the reservation information is deleted.

16. The computer system according to claim 9 wherein said at least one memory module includes an on-hold file for storing therein and repetitively transmitting therefrom on the signal bus current status of logical processing of information for a selected user station in anticipation of interruption of logical operations prior to completion thereof.

17. A computer systems according to claim 9 comprising:

one of said plural bus interfaces coupled to a selected computing unit for selecting and transferring to the selected computing unit a desired portion of the data and instructions being sequentially and repetitively transmitted on the signal bus from the at least one memory module.

18. The system according to claim 9 wherein the plurality of segregated arrays of the at least one of data and instructions each includes a distinctive identification for repetitive and sequential transmissions therewith on the signal bus; and the bus interfaces supply to the corresponding computing units portions of the at least one of data and instructions repetitively transmitted on the signal bus and selected by the bus interfaces in response to a selected distinctive identification.

19. The computing system according to claim 9 wherein said switch means provides logical computations from the plurality of computing units to the associated user stations.

20. The computer system according to claim 9 comprising:

a plurality of signal channels forming said signal bus, each signal channel being coupled to a segregated array of the memory module for sequentially and repetitively transmitting at least one of data and instructions from the segregated array; and the plurality of bus interfaces connected to each of the plurality of computing units includes each of the plural bus interfaces for a computing unit connected to a separate signal channel of the signal bus for receiving substantially simultaneously at each bus interface connected to a common signal channel the at least one of data and instructions that are sequentially and repetitively transmitted on such common signal channel and selected by each such plural bus interface for transfer to the associated computing unit.

* * * * *